United States Patent
Ferrell et al.

(10) Patent No.: US 11,690,319 B2
(45) Date of Patent: Jul. 4, 2023

(54) SPEED CONTROL ASSEMBLY

(71) Applicant: TTI (MACAO COMMERCIAL OFFSHORE) LIMITED, Macau (CN)

(72) Inventors: James C. Ferrell, Elberton, GA (US); William E. Colber, Lavonia, GA (US); Dayu Feng, Seneca, SC (US)

(73) Assignee: Techtronic Outdoor Products Technology Limited, Hamilton (BM)

( * ) Notice: Subject to any disclaimer, the term of this patent is extended or adjusted under 35 U.S.C. 154(b) by 637 days.

(21) Appl. No.: 16/624,200

(22) PCT Filed: Jun. 22, 2018

(86) PCT No.: PCT/US2018/038970
§ 371 (c)(1),
(2) Date: Dec. 18, 2019

(87) PCT Pub. No.: WO2018/237251
PCT Pub. Date: Dec. 27, 2018

(65) Prior Publication Data
US 2020/0107497 A1    Apr. 9, 2020

Related U.S. Application Data

(60) Provisional application No. 62/524,179, filed on Jun. 23, 2017.

(51) Int. Cl.
*A01D 34/82*    (2006.01)
*A01D 34/68*    (2006.01)
(Continued)

(52) U.S. Cl.
CPC ....... *A01D 34/824* (2013.01); *A01D 34/6806* (2013.01); *A01D 34/78* (2013.01);
(Continued)

(58) Field of Classification Search
CPC ... A01D 34/824; A01D 34/6806; A01D 34/78
See application file for complete search history.

(56) References Cited

U.S. PATENT DOCUMENTS

| 3,971,198 A | 7/1976 | Lane |
| 5,138,824 A | 8/1992 | Oshima et al. |

(Continued)

FOREIGN PATENT DOCUMENTS

| CN | 201752182 U | 3/2011 |
| CN | 201752183 U | 3/2011 |

(Continued)

OTHER PUBLICATIONS

International Search Report and Written Opinion for Application No. PCT/US2018/038970 dated Oct. 18, 2018 (14 pages).

(Continued)

*Primary Examiner* — Abigail A Risic
(74) *Attorney, Agent, or Firm* — Michael Best & Friedrich LLP

(57) ABSTRACT

A mower including a handle assembly, a grip moveable relative to the handle assembly, a sensor operable to generate an output signal based on a position of the grip relative to the handle assembly, a drive assembly, and a controller coupled to the sensor and the drive assembly. The controller receives the output signal and controls the drive assembly according to the output signal.

20 Claims, 7 Drawing Sheets

(51) Int. Cl.
*A01D 34/78* (2006.01)
*A01D 69/02* (2006.01)
*A01D 101/00* (2006.01)

(52) U.S. Cl.
CPC ...... *A01D 69/02* (2013.01); *A01D 2034/6843* (2013.01); *A01D 2101/00* (2013.01)

(56) References Cited

U.S. PATENT DOCUMENTS

| | | | |
|---|---|---|---|
| 6,065,555 A † | 5/2000 | Yuki | |
| 6,082,083 A * | 7/2000 | Stalpes | A01D 34/6806 56/11.1 |
| 6,105,348 A | 8/2000 | Turk et al. | |
| 6,501,281 B1 | 12/2002 | Rundo | |
| 6,651,608 B2 | 11/2003 | Steffen | |
| 6,705,961 B2 | 3/2004 | Johnson et al. | |
| 6,769,501 B2 | 8/2004 | Iida et al. | |
| 6,796,392 B2 | 9/2004 | Kobayashi et al. | |
| 6,848,523 B2 | 2/2005 | Ishikawa et al. | |
| 7,111,443 B2 | 9/2006 | Anderson et al. | |
| 7,318,309 B2 | 1/2008 | Osborne | |
| 7,328,563 B1 | 2/2008 | Anderson et al. | |
| 7,367,173 B2 | 5/2008 | Daly et al. | |
| 7,543,429 B2 | 6/2009 | Kaskawitz et al. | |
| 7,610,738 B2 | 11/2009 | Daly et al. | |
| 7,644,781 B2 | 1/2010 | Moriyama et al. | |
| 7,744,503 B2 | 6/2010 | Kobayashi et al. | |
| 8,327,961 B2 | 12/2012 | Arpino | |
| 9,403,435 B2 | 8/2016 | Bejcek | |
| 9,538,699 B1 | 1/2017 | Bejcek et al. | |
| 9,556,572 B2 * | 1/2017 | Duchscherer | B62D 11/02 |
| 9,696,749 B2 | 7/2017 | Kaskawitz et al. | |
| 9,706,706 B2 | 7/2017 | Barendrecht | |
| 9,949,430 B2 | 4/2018 | Jackson et al. | |
| 9,968,031 B2 | 5/2018 | Bejcek et al. | |
| 10,039,229 B2 | 8/2018 | Wadzinski et al. | |
| 10,111,381 B2 | 10/2018 | Shaffer et al. | |
| 10,123,478 B2 | 11/2018 | Shaffer et al. | |
| 11,191,210 B2 † | 12/2021 | Wilks | |
| 2002/0034994 A1 | 3/2002 | Johnson et al. | |
| 2003/0144774 A1 | 7/2003 | Trissel et al. | |
| 2004/0152546 A1 | 8/2004 | Johnson et al. | |
| 2005/0144919 A1 | 7/2005 | Osborne | |
| 2007/0271892 A1 | 11/2007 | Sasaoka | |
| 2008/0047246 A1 | 2/2008 | Osborne | |
| 2009/0266042 A1 † | 10/2009 | Mooney | |
| 2010/0000192 A1 | 1/2010 | Robison | |
| 2010/0162674 A1 | 7/2010 | Eaton et al. | |
| 2013/0046448 A1 * | 2/2013 | Fan | A01D 34/68 56/10.8 |
| 2014/0102068 A1 | 4/2014 | Zhang | |
| 2014/0190141 A1 | 7/2014 | Edholm et al. | |
| 2017/0367258 A1 * | 12/2017 | Shaffer | A01D 34/6812 |
| 2017/0367259 A1 † | 12/2017 | Shaffer | |
| 2017/0367265 A1 | 12/2017 | Wadzinski et al. | |
| 2018/0116119 A1 | 5/2018 | Wu et al. | |
| 2018/0343796 A1 | 12/2018 | Porter et al. | |
| 2018/0368316 A1 | 12/2018 | Shaffer et al. | |

FOREIGN PATENT DOCUMENTS

| | | |
|---|---|---|
| CN | 102232333 A | 11/2011 |
| EP | 1106046 A1 | 6/2001 |
| EP | 1285568 A1 | 2/2003 |
| EP | 1457103 A1 | 9/2004 |
| EP | 1550364 A1 | 7/2005 |
| EP | 1597957 A | 11/2005 |
| GB | 2375745 A | 11/2002 |
| JP | S6094040 U | 6/1985 |
| WO | 199618067 A1 | 6/1996 |
| WO | 2009033859 A1 | 3/2009 |
| WO | 2017158095 A1 | 9/2017 |

OTHER PUBLICATIONS

International Preliminary Report on Patentability for Application No. PCT/US2018/038970 dated Dec. 24, 2019 (11 pages).
Extended European Search Report for Application No. 18820141.2 dated Jun. 21, 2021 (8 pages).
Chinese Patent Office Action for Application No. 201880033055.9 dated Nov. 19, 2021 (10 pages including statement of relevance).

* cited by examiner
† cited by third party

SPEED CONTROL ASSEMBLY

CROSS-REFERENCE TO RELATED APPLICATIONS

This application is a national phase filing under 35 U.S.C. 371 of International Application No. PCT/US2018/038970 filed on Jun. 22, 2018, which claims priority to U.S. Provisional Patent Application No. 62/524,179 filed on Jun. 23, 2017, the entire contents of which are incorporated herein by reference.

FIELD OF THE INVENTION

The present invention relates to a speed control system, and more particularly to a speed control system for a lawn mower.

SUMMARY OF THE INVENTION

The present invention provides, in one aspect, a mower including a handle assembly, a grip moveable relative to the handle assembly, a sensor operable to generate an output signal based on a position of the grip relative to the handle assembly, a drive assembly, and a controller coupled to the sensor and the drive assembly. The controller receives the output signal and controls the drive assembly according to the output signal.

The present invention provides, in another aspect, a mower including an upper arm, a cross member coupled to the upper arm, and a housing coupled to the cross member and the upper arm. The mower further includes a grip at least partially received within the housing. The grip is movable relative to the housing. A biasing member biasing the grip, and the biasing member is at least partially positioned within the housing. A sensor is positioned within the housing, and the sensor generates a control signal based on the position of the grip with respect to the housing. The mower further includes a controller that receives the control signal and operates the mower based on the control signal.

The present invention provides, in another aspect, a mower including a deck defining a handle pivot axis, a drive system, a handle member coupled to the deck and rotatable with respect to the deck about the handle pivot axis, a lower arm coupled to the handle member, a upper arm telescopically coupled to the lower arm, and a speed control assembly. The speed control assembly includes a housing coupled to the upper arm and a grip at least partially received within the housing and movable relative to the upper arm. The speed control assembly further includes a sensor positioned within the housing. The sensor detecting displacement of the grip relative to the upper arm and generating a control signal. A controller receives the control signal and operates the drive system based on the control signal.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
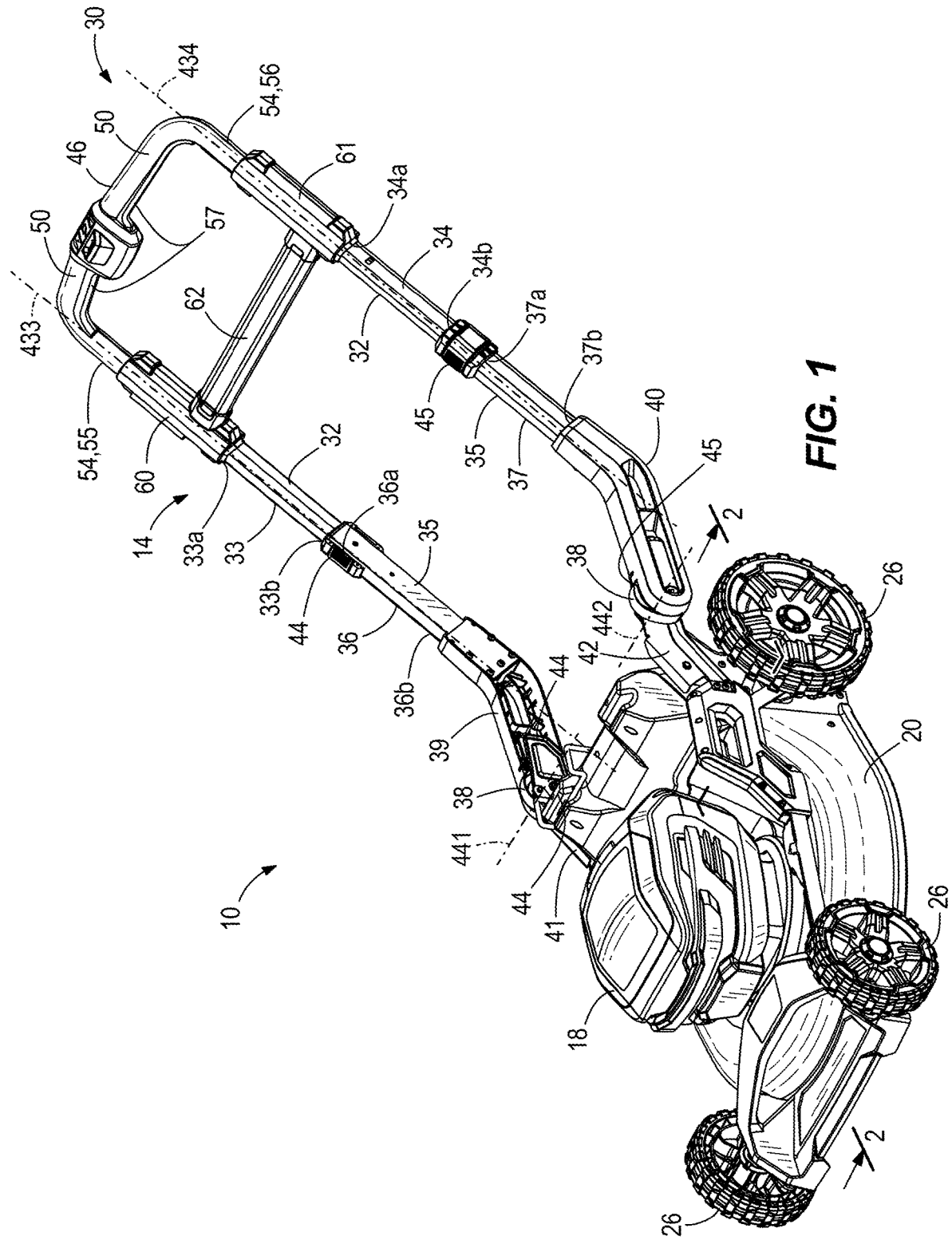
FIG. 1 is a perspective view of a lawn mower including a speed control assembly in accordance with an embodiment of the invention.
Figure 2:
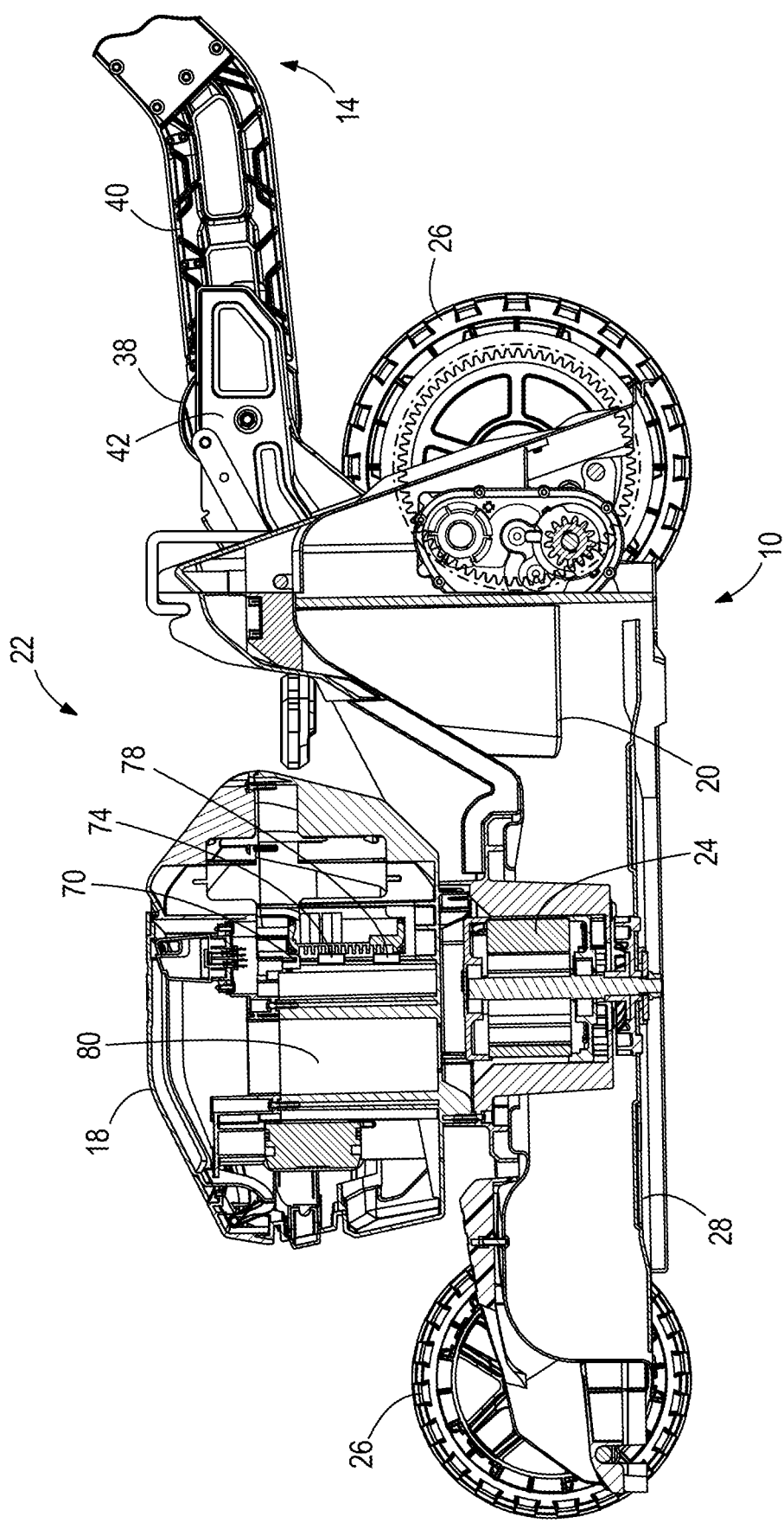
FIG. 2 is a partial section view of the lawn mower of FIG. 1 taken along the line 2-2 shown in FIG. 1.

FIGS. 1 and 2 illustrate a lawn mower 10 including a handle assembly 14 pivotally coupled to a main body 18 that supports a drive system assembly 22 (FIG. 2). The drive system 22 includes, for example, an electric motor 24 powered by a battery pack 80 received within the main body 18. The motor 24 drives a set of wheels 26, which support the main body 18 for movement over a surface. In the illustrated embodiment, the rear wheels 26 are driven by the drive system 22, but alternative embodiments include both the front and the rear wheels being driven by the drive system 22. A transmission is coupled to the motor 24 to reduce the rotational speed from the motor 24 and to transfer the motor torque to the wheels 26. The mower 10 further includes a cutting element 28 rotationally supported on a mower deck 20 positioned beneath the main body 18. The cutting element 28 is ultimately driven by the motor 24. In alternative embodiments, the cutting element 28 may be driven by a motor separate from the motor that drives the wheels 26. As described in greater detail below, the mower 10 also includes a speed control assembly 30 that controls the operation of the drive system 22. More specifically, the speed control assembly 30 automatically controls the ground travel speed of the lawn mower 10 based on a user's walking pace.

With continued reference to FIGS. 1 and 2, the handle assembly 14 is pivotally coupled to the main body 18 such that the handle assembly 14 may be rotated between discrete positions relative to the main body 18. The handle assembly 14 includes a pair of lower arms 35 and a pair of upper arms 32. The pair of upper arms 32 include a first upper arm 33 operable to translate along a first longitudinal axis 433 and a second upper arm 34 operable to translate along a second longitudinal axis 434. In the illustrated embodiment, the first longitudinal axis 433 is parallel to the second longitudinal axis 434. The handle assembly 14 further includes a cross member 62 that extends transversely between the first upper arm 33 and the second upper arm 34 to, among other things, provide lateral support for the handle assembly 14. In the illustrated embodiment, the cross member 62 is integral with the upper arms 32 at an upper end 33a of the first upper arm 33 and integral with an upper end 34a of the second upper arm 34. In particular, a first corner 63 is formed at the connection of the first upper arm 33 and the cross member 62, and a second corner 64 is formed at the connection of the second upper arm 34 and the cross member 62. In other embodiments, the cross member 62 is removably coupled to the pair of upper arms 32. The pair of upper arms 32 are telescopically received by the pair of lower arms 35 through a first adjustment connector 44 and a second adjustment connector 45. In other words, the distance the upper arms 32 extend away from lower arms 35 is adjustable by a user via the connectors 44, 45.

The pair of lower arms 35 includes a first lower arm 36 and a second lower arm 37. The first lower arm 36 is coupled to a first offset arm handle member 39, and the second lower arm 37 is coupled to a second offset arm handle member 40. The first offset arm 39 is pivotally coupled to a first bracket 41 of the mower deck 20 about a first handle pivot axis 441. Likewise, the second offset arm 40 is pivotally coupled to a second bracket 42 of the mower deck 20 about a second handle pivot axis 442. The handle assembly 14 also includes a locking mechanism 38 coupled to the pair of lower arms 35 to releasably retain the handle assembly 14 at various pivoted positions relative to the main body 18. In other words, the locking mechanism 38 is operable to secure the handle assembly 14 in various positions (e.g., a storage position, a vertical position, a small-angle position, a large-angle position, etc.) relative to the main body 18.

Figure 3:
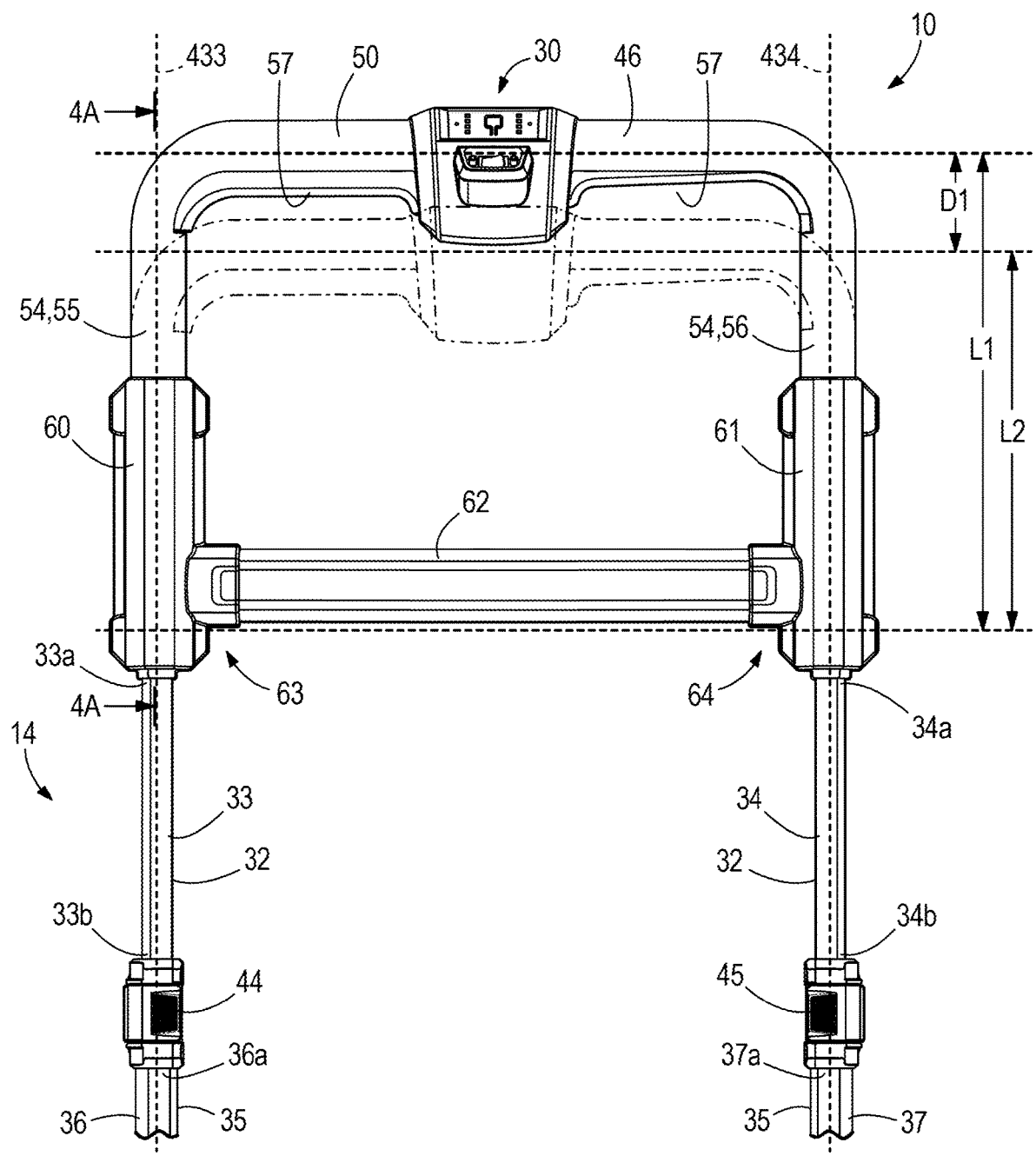
FIG. 3 is a front view of the lawn mower and the speed control assembly of FIG. 1.

With reference to FIG. 3, the speed control assembly 30 includes a U-shaped grip 46 with a gripping portion 50 and a pair of grip legs 54, including a first grip leg 55 and a second grip leg 56. The gripping portion 50 is oriented substantially parallel to the cross member 62, and the gripping portion 50 extends the entire width of the cross member 62. The first grip leg 55 is slidably coupled to the first upper arm 33, and the second grip leg 56 is slidably coupled to the second upper arm 34. As such, the grip 46 is moveable relative to the handle assembly 14. A bail control 57 is also positioned on the grip 46.

With continued reference to FIGS. 2-3, the speed control assembly 30 further includes a first housing 60 and a second housing 61. Both the first housing 60 and the second housing 61 are formed as clam-shell housings that partially enclose the grip 46 and the handle assembly 14, and both housings 60, 61 are coupled to the cross member 62. In particular, the first grip leg 55 is partially received by the first housing 60, and the second grip leg 56 is partially received by the second housing 61. The first housing 60 is coupled to the first corner 63 of the handle assembly 14 and the second housing 61 is coupled to the second corner 64 of the handle assembly 14. In other words, the U-shaped grip 46 is partially received within both the first housing 60 and the second housing 61.

Figure 4A:
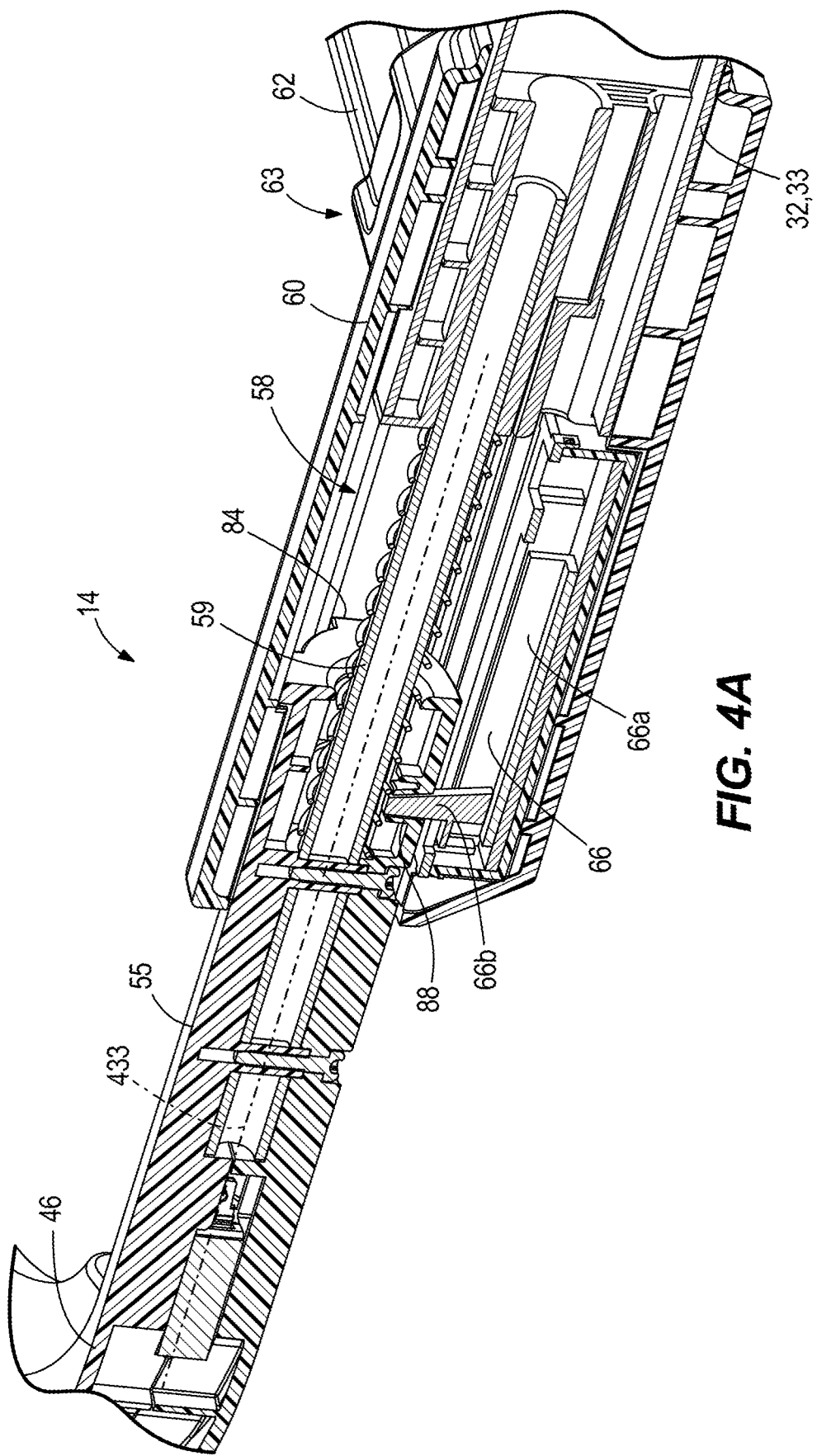
FIG. 4A is a section view of the speed control assembly taken along the line of 4A-4A shown in FIG. 3, illustrating a grip of the speed control assembly in a first position.

With reference to FIG. 4A, the legs 54 of the grip 46 are telescopically coupled to the upper arms 32. Specifically, the first grip leg 55 is received within a hollow portion 58 of the first housing 60, such that the grip 46 is linearly displaceable (e.g., slidable) along the first longitudinal axis 433 relative to the first upper arm 33. In a similar manner, the second grip leg 56 is received within a hollow portion of the second housing 61 such that the grip 46 is linearly displaceable along the second longitudinal axis 434 relative to the second upper arm 34. In particular, a rod 59 extends from the first grip 46 to the first upper arm 33. In alternate embodiments, the upper arms 32 are received within a hollow portion of the respective grip legs 54 (or vice versa) while the grip 46 remains linearly displaceable relative to the pair of upper arms 32.

Figure 4B:
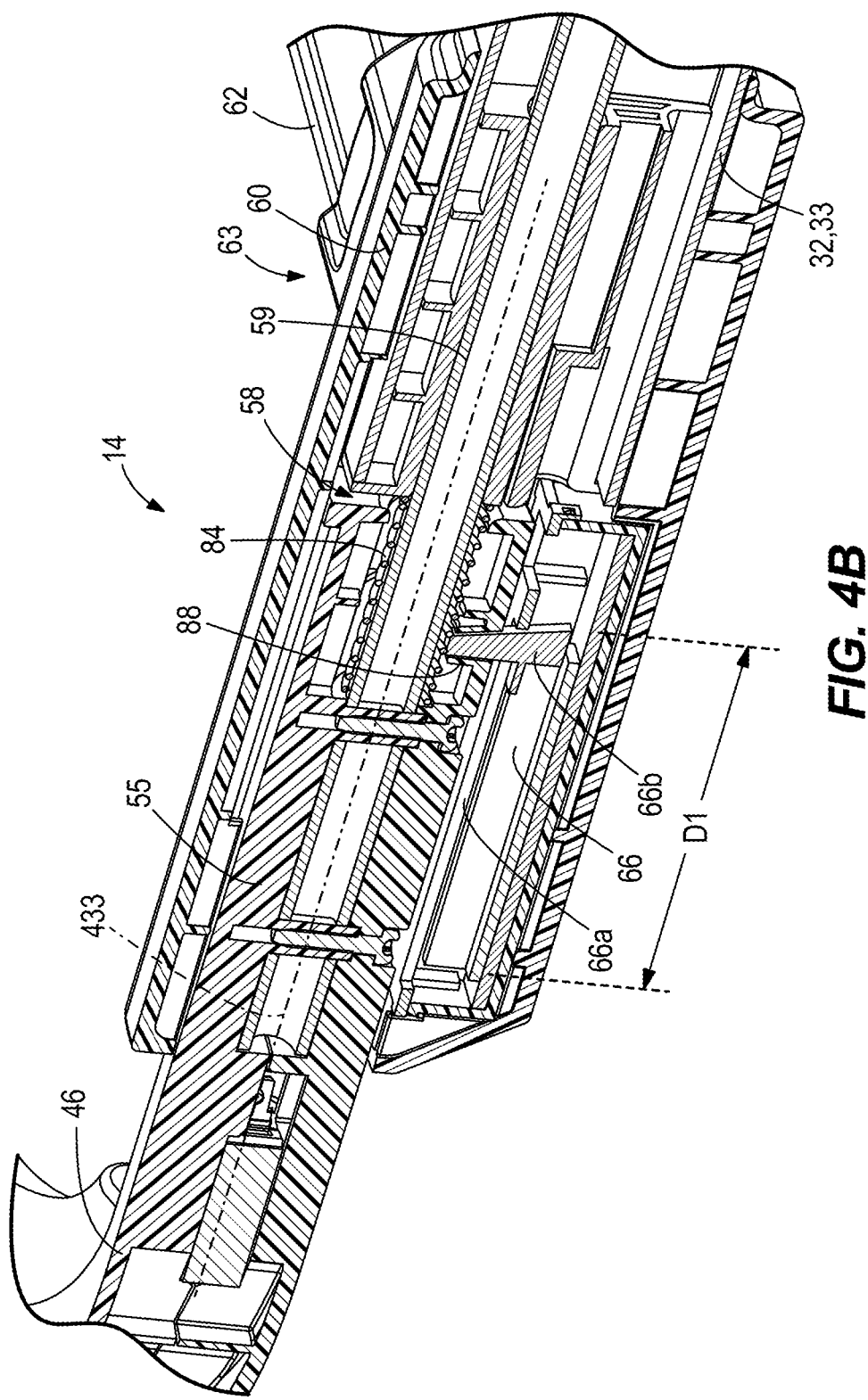
FIG. 4B is another section view of the speed control assembly and taken along the line of 4A-4A shown in FIG. 3, illustrating the grip of the speed control assembly in a second position.

FIGS. 4A and 4B illustrate a section of the first housing 60, the grip 46, and the cross member 62. The grip 46 is at least partially received within the first housing 60 and is coupled to the sensor 66. A biasing member 84 is positioned within the first housing 60 and is biases the grip 46 along the first longitudinal axis 433. Specifically, the biasing member 84 is positioned between the grip 46 and the handle assembly 14. In the illustrated embodiment, the biasing member 84 is a linear spring element. In particular, the biasing member 84 acts upon the grip 46 and the upper arms 32, to urge the grip 46 away from the cross member 62, toward an extended, first position (FIG. 4A). Similarly, the grip 46 is movable toward the cross member 62, against the bias of the biasing member 84 to a compressed, second position (FIG. 4B).

With reference to FIGS. 3, 4A and 4B, the speed control assembly 30 further includes a sensing device (e.g., a sensor 66) positioned within the first housing 60. The sensor 66 is supported, for example, by the cross member 62 adjacent one of the legs 54 of the grip 46. The sensor 66 detects and/or measures the displacement of the grip 46 relative to the cross member 62 (and the upper arms 32). In the illustrated embodiment, the sensor 66 is an optical-encoder array. In alternative embodiments, the sensing device 66 is a proximity sensor, a linear potentiometer, a rotary potentiometer, a magnetic transducer, a Hall-effect sensor, a photovalic sensor, a capacitive sensor, a digital position encoder, transducer, or other similar sensor. In further alternative embodiments, the sensor 66 may be an electrical switch that is opened and closed in response to the grip 46 moving to a predetermined location relative to the cross member 62. Any suitable sensing device for measuring the displacement of the grip 46 relative to the cross member 62 and the main body 18 is considered as part of this invention. For example, the sensing device may detect a force on the grip 46 by a user, as described in greater detail with respect to FIG. 7.

With reference to FIG. 2, the sensor 66 is electrically connected to a controller 70 (e.g., a drive system controller, motor controller, etc.) with memory 74 and a processor 78. Specifically, the sensor 66 generates an electrical output signal (i.e., a control signal) that is received by controller 70. The output signal from the sensor 66 is based on the position of the speed control assembly 30. More specifically, the output signal is based on a position of the grip 46 relative to the handle assembly 14. The memory 74 of the controller 70 stores software setting forth operational parameters for the drive system 22 as determined by the output signal received from the sensor 66. In particular, the processor 78 of the controller 70 executes the software to control the function of the drive system 22 (e.g., a speed and/or a direction at which the drive system 22 drives the wheels 26) based on the control output signal from the sensor 66. In other words, the controller 70 receives the output signal from the sensor 66 and controls a speed of the drive system assembly 22 according to the output signal. In one example, the drive system controller 70 will measure a change in the control signal over time as an input to alter the speed and/or direction at which the drive system 22 drives the wheels 26. The output signal from the sensor 66 varies with movement of the grip 46 relative to the cross member 62. In other words, the sensor 66 generates a control output signal (e.g., an analog signal or a digital signal) that is proportional to the magnitude of displacement of the grip 46 relative to the cross member 62, or other suitable portion of the handle assembly 14. Alternatively, when the sensing device is an electrical switch, a circuit containing the switch may be open or closed, either activating or deactivating the motor 24.

The sensor 66 is positioned within the first housing 60, underneath the biasing member 84. A first portion 66a of the sensor 66 is fixed with respect to the handle assembly 14, and a second portion 66b of the sensor 66 is coupled to the first grip leg 55. In other words, the second portion 66b is affixed within a recess 88 formed within the first grip leg 55 and is movable with the grip 46 as the grip 46 translates along the first longitudinal axis 433. As such, the second portion 66b is movable relative to the first portion 66a of the sensor 66.

With reference to FIG. 4A, the grip 46 is in a first position. That is, the spring element 84 is uncompressed, and the sensing device 66 is not actuated. In the first position, the tab 66b is at one end of the sensing device 66, and the mower 10 is controlled to have no ground speed. With reference to FIG. 4B, the grip 46 is in the second position, which corresponds to maximum ground speed operation. That is, the spring element 84 is fully compressed and the sensing device 66 is fully actuated. In the second position, the mower 10 is controlled to have a maximum ground speed, and the tab 66b is at a full actuation distance D1, indicating maximum compression of the spring element 84.

In operation, the grip 46 is moved between the extended, first position (FIG. 4A), in which the control signal does not actuate the drive system 22 to drive the wheels 26, and the compressed, second position, in which the control signal actuates the drive system 22 to drive the wheels 26. The speed at which the wheels 26 are driven by the drive system 22 is determined by the compression of the grip 46 with respect to the handle assembly 14 (e.g., the cross member 62). In other words, the ground travel speed of the lawn mower 10 is determined by the amount of compression that results from the user's pushing the grip 46 as the user is walking. More specifically, the grip 46 moves between the first position, in which the grip 46 is positioned at a first length L1 measured from the gripping portion 50 to the cross member 62. In the illustrated embodiment, the first length L1 coincides with deactivation of the drive system 22 (i.e., zero ground travel speed). When the grip 46 moves to a second position, the grip 46 is disposed at a second length L2 measured from the griping portion 50 to the cross member 62. The sensor 66 detects the displacement of the grip 46 and generates an output control signal that ultimately actuates the drive system 22 to drive the wheels 26 at a speed that matches the user's walking pace. A full actuation distance D1 is defined as the difference in the first length L1 and the second length L2. Between the first position and the second position, the drive system 22 may drive the wheels 26 at a variable speed that is proportional to the percentage of the actuation distance D1 that the grip 46 has been displaced. For example, if the grip 46 is moved halfway between the first position and the second position, the drive system 22 drives the wheels 26 at half of the predetermined speed.

In response to the grip 46 moving with respect to handle assembly 14, the output electrical signal is generated by the tab 66b moving with respect to the first portion 66a of the sensor 66. In other words, the sensor 66 measures the displacement of the grip 46 against the spring element 84 in order to gauge the user's desired speed. The output signal from the sensor 66 is received and processed by the drive system controller 70 and the controller 70 drives the motor 24 to drive the wheels 26 at a corresponding speed. An increase of force exerted on the grip 46 by the user results in the grip 46 further compressing the spring 84 and further moving the tab 66b with respect to the first portion 66a. Such an increase in translation would alter the output signal from the sensor 66 to request an increase of power to the electric motor 24 and a greater speed of the mower 10.

Figure 5:
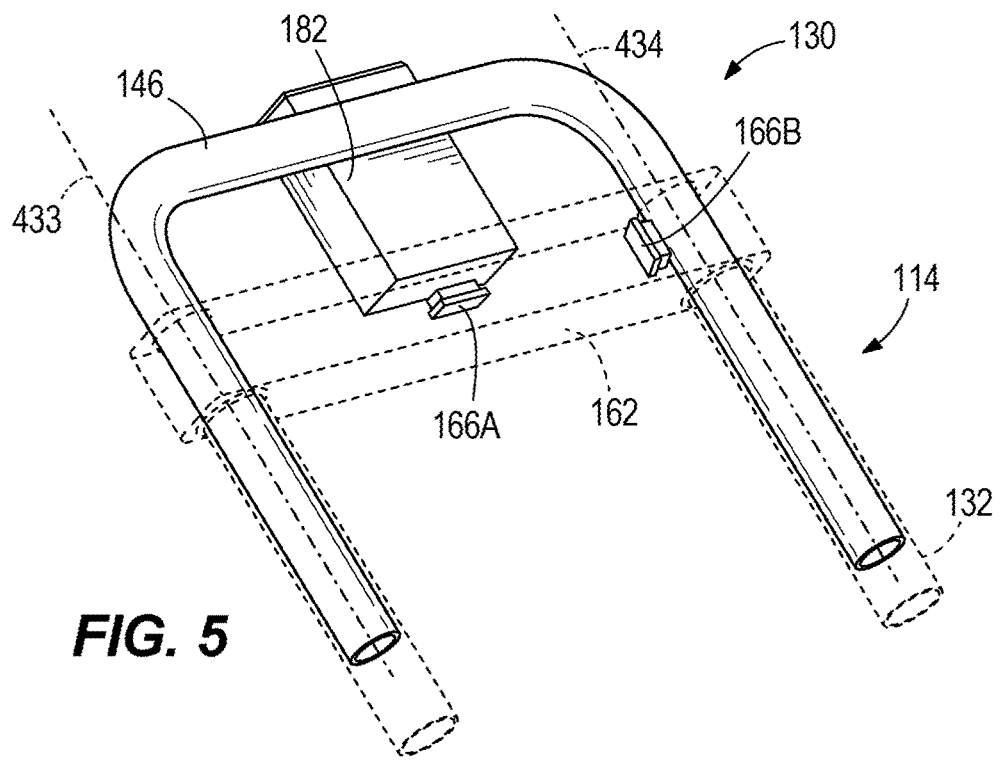
FIG. 5 is a perspective view of a speed control assembly in accordance with another embodiment of the invention.

With reference to FIG. 5, a speed control assembly 130 in accordance with another embodiment of the invention is coupled to a corresponding handle assembly 114. The speed control assembly 130 and the handle assembly 114 are similar to the speed control assembly 30 and handle assembly 14 shown in FIGS. 1-3, and common elements will have the same reference numeral plus "100". As shown in FIG. 5, the speed control assembly 130 further includes a support member 182, which extends between the grip 146 and the cross member 162, and which is movable with the grip 146 relative to the cross member 162. In this embodiment, the sensing device 166A may be supported centrally on the cross member 162 for actuation by the support member 182. In this configuration, the sensing device 166A may be a "plunger style" sensor that is actuated when the support member 182 is displaced relative to the cross member 162 (i.e., when the grip 146 is displaced upon actuation) along the first longitudinal axis 433 and the second longitudinal axis 434. Alternatively, as described above and shown in FIG. 3, the sensing device 166B may be a "slide style" sensor that is supported at one of the ends of the cross member 162 and that is actuated by relative movement between the grip 146 and the cross member 162 connected to the arms 132.

Figure 6:
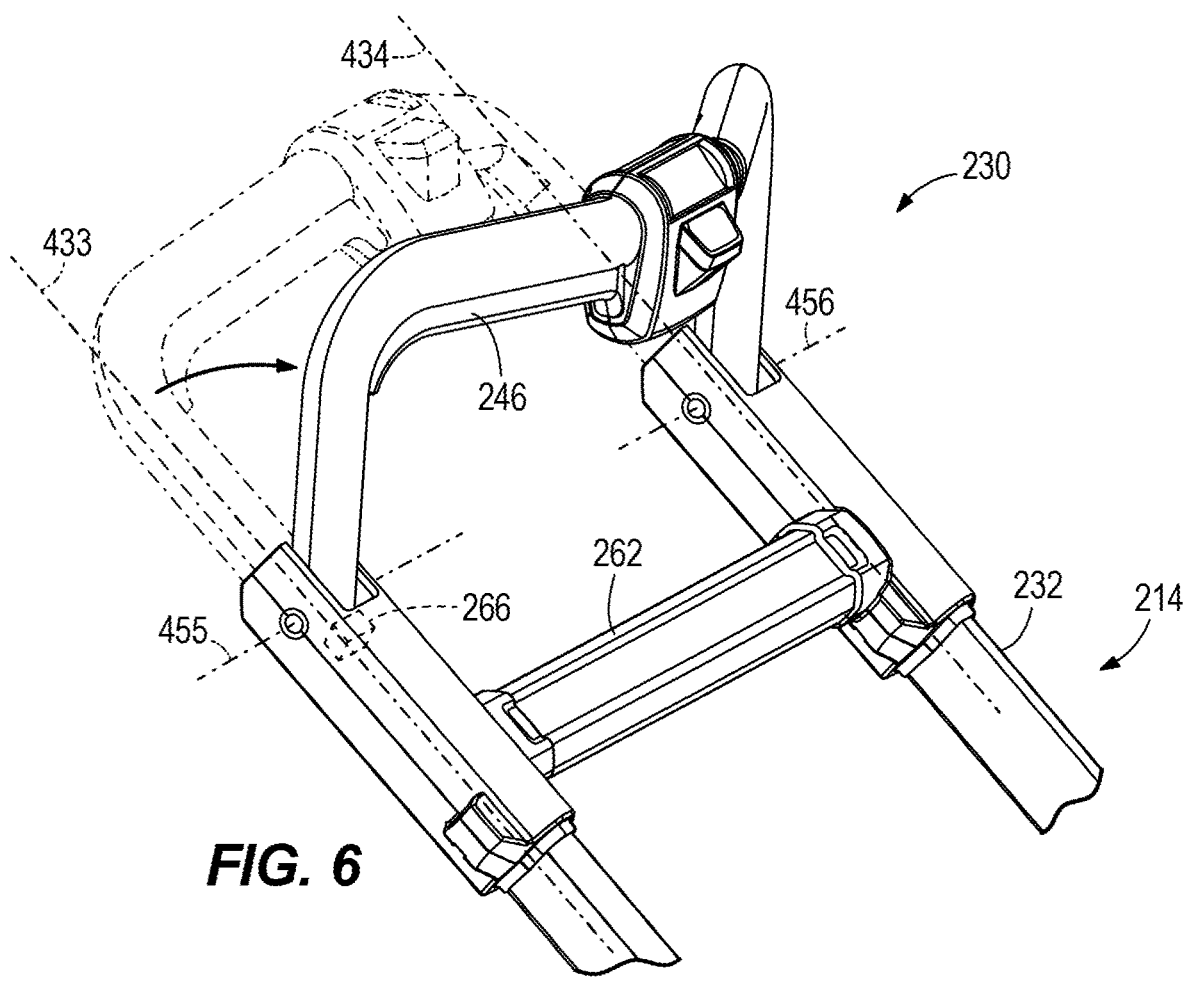
FIG. 6 is a perspective view of a speed control assembly in accordance with another embodiment of the invention.

FIG. 6 illustrates a speed control assembly 230 in accordance with yet another embodiment of the invention coupled a corresponding handle assembly 214. The speed control assembly 230 and the handle assembly 214 are similar to the speed control assemblies 30, 130 and handle assemblies 14, 114 shown in FIGS. 1-3 or FIG. 5, and common elements will have the same reference numeral as the embodiment shown in FIGS. 1-3 plus "200". The speed control assembly 230 includes a grip 246 pivotally coupled to the cross member 262 and/or the arms 234 of the handle assembly 214. The sensing device 266 is actuated by pivoting the grip 246 from the first position (shown with line shading) to the second position (shown without line shading) in a clockwise direction about the first grip pivot axis 455 and the second grip pivot axis 456 from the frame of reference of FIG. 6. In other words, the sensing device 266 detects the amount of pivotal rotation of the grip 246. Similar to the speed control assembly 30 described above, the grip 246 is biased towards the first position by a biasing member (e.g., a torsion spring). In further alternative embodiments, the sensing device 266 is a torque sensor to measure the amount of torque a user places on the grip 246.

Figure 7:
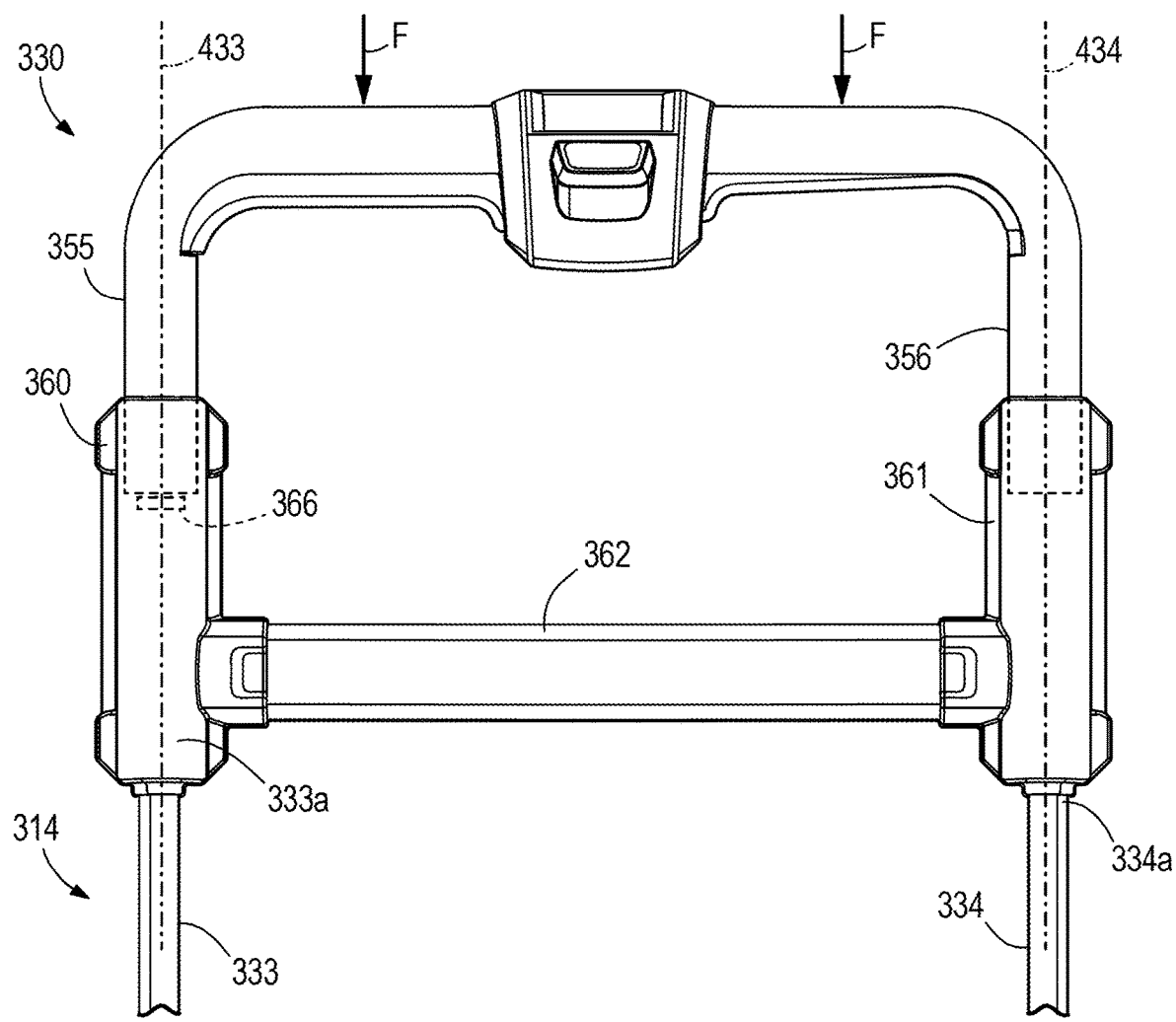
FIG. 7 is a front view of a speed control assembly in accordance with another embodiment of the invention.

FIG. 7 illustrates a speed control assembly 330 in accordance with a further embodiment of the invention coupled to a corresponding handle assembly 314. The speed control assembly 330 and the handle assembly 314 are similar to the speed control assemblies 30, 130, 230 and handle assemblies 14, 114, 214 shown in FIGS. 1-3, FIG. 5 or FIG. 6, and common elements will have the same reference numeral as the embodiment shown in FIGS. 1-3 plus "300". The speed control assembly 330 includes a grip 346 coupled to the pair of upper arms 332 of the handle assembly 314. In this embodiment, the grip 346 is only marginally movable relative to the upper arms 332 of the handle assembly 314. The sensing device 366 is a pressure or force-sensitive device (i.e., a force sensor) that detects a force F applied to the grip 346 by a user in the direction of the handle assembly 314 (e.g., down in FIG. 7).

Although the invention has been described in detail with reference to certain preferred embodiments, variations and modifications exist within the scope and spirit of one or more independent aspects of the invention as described.

What is claimed is:

1. A mower comprising:
a handle assembly including a cross member;
a grip moveable longitudinally relative to the cross member;
a sensor operable to generate an output signal based on a position of the grip relative to the cross member;
a drive assembly; and
a controller coupled to the sensor and the drive assembly;
wherein the controller receives the output signal and controls the drive assembly according to the output signal.

2. The mower of claim 1, further comprising a housing coupled to the handle assembly, wherein the grip is at least partially received within the housing.

3. The mower of claim 2, wherein the sensor is positioned within the housing.

4. The mower of claim 1, wherein the output signal is proportional to the magnitude of displacement of the grip relative to the cross member.

5. The mower of claim 2, wherein the housing is coupled to a corner of the handle assembly.

6. The mower of claim 1, wherein the sensor is a transducer.

7. The mower of claim 1, further comprising a wheel coupled to the drive assembly, and wherein the controller controls a speed of the wheel according to the output signal.

8. The mower of claim 1, wherein the drive assembly includes an electric motor.

9. The mower of claim 1, wherein a first portion of the sensor is coupled to the grip and moves with the grip as the grip moves relative to the handle assembly; and wherein a second portion of the sensor is fixed with respect to the handle assembly.

10. The mower of claim 1, wherein the grip translates along a longitudinal axis of the handle assembly.

11. The mower of claim 1, further comprising a biasing member positioned between the grip and the handle assembly.

12. The mower of claim 1, further comprising a cutting element rotationally supported on a mower deck.

13. A mower comprising:
a first upper arm;
a second upper arm;
a cross member extending transversely between the first upper arm and the second upper arm;
a first housing coupled to the cross member and the first upper arm;
a second housing coupled to the cross member and the second upper arm;
a grip at least partially received within the first housing and the second housing, wherein the grip is movable relative to the first and second housings;
a biasing member biasing the grip, the biasing member at least partially positioned within the housing;
a sensor positioned within the housing, wherein the sensor generates a control signal based on the position of the grip with respect to the cross member; and
a controller that receives the control signal and operates the mower based on the control signal.

14. The mower of claim 13, wherein the sensor is an optical-encoder array.

15. The mower of claim 13, wherein the sensor is a force sensor operable to measure the amount of force applied to the grip by a user.

16. The mower of claim 13, further comprising a lower arm pivotally coupled to a bracket attached to a deck of the mower and wherein a lower end of the upper arm is telescopically received by an upper end of the lower arm.

17. The mower of claim 13, wherein the grip translates along a longitudinal axis defined by the upper arm.

18. The mower of claim 13, wherein the grip is pivotally coupled to the upper arm.

19. A mower comprising:
a deck defining a handle pivot axis;
a drive system;
a handle member coupled to the deck and rotatable with respect to the deck about the handle pivot axis;
a lower arm coupled to the handle member;
an upper arm telescopically coupled to the lower arm; and
a speed control assembly including:
a housing coupled to the upper arm;
a grip at least partially received within the housing and movable relative to the upper arm;
a sensor positioned within the housing, the sensor detecting displacement of the grip relative to the upper arm and generating a control signal, and
a controller that receives the control signal and operates the drive system based on the control signal, wherein the control signal is proportional to the magnitude of displacement of the grip relative to the upper arm.

20. The mower of claim 19, wherein the upper arm defines a longitudinal axis and the grip translates along the longitudinal axis.

* * * * *